US012737247B2

(12) United States Patent
Fan

(10) Patent No.: US 12,737,247 B2
(45) Date of Patent: Sep. 15, 2026

(54) INTELLIGENT SCORE-BASED LOG COLLECTION OPTIMIZING MECHANISM

(71) Applicant: Dell Products, L.P, Round Rock, TX (US)

(72) Inventor: Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 15 days.

(21) Appl. No.: 18/740,757

(22) Filed: Jun. 12, 2024

(65) Prior Publication Data

US 2025/0021421 A1 Jan. 16, 2025

(30) Foreign Application Priority Data

Jul. 12, 2023 (CN) ........................ 202310855552.X

(51) Int. Cl.
*G06F 11/07* (2006.01)

(52) U.S. Cl.
CPC ...... *G06F 11/0787* (2013.01); *G06F 11/0721* (2013.01)

(58) Field of Classification Search
CPC .................................................. G06F 11/3476
See application file for complete search history.

(56) References Cited

U.S. PATENT DOCUMENTS 10,911,470 B2 * 2/2021 Muddu ............... G06F 16/9024
11,500,712 B1 * 11/2022 Chopra ............... G06F 11/0778
2009/0193298 A1 * 7/2009 Mukherjee .......... G06F 11/0766
714/38.1

* cited by examiner

*Primary Examiner* — Amine Riad
(74) *Attorney, Agent, or Firm* — Krishnendu Gupta; Lesley Leonessa

(57) ABSTRACT

Methods, system, and non-transitory processor-readable storage medium for a log collection optimization system are provided herein. An example method includes monitoring, by a system status monitoring module, at least one system status associated with an information system, where the information system comprises a plurality of system components. A system anomaly detection module determines a system score for the information system, based on a dynamic weighted calculation and an average performance evaluation. The system score facilitates predicting an impending error before the error occurs on the information system. A target component assignment module determines a plurality of targeted components that require log collection based on the system score, wherein the plurality of system components comprises the plurality of targeted components. A log collection module invokes system log collection from the targeted components to initiate the system log collection before the error occurs on the information system.

20 Claims, 5 Drawing Sheets

300 — MONITOR, BY A SYSTEM STATUS MONITORING MODULE, AT LEAST ONE SYSTEM STATUS ASSOCIATED WITH AN INFORMATION SYSTEM, WHEREIN THE INFORMATION SYSTEM COMPRISES A PLURALITY OF SYSTEM COMPONENTS

302 — DETERMINE, BY A SYSTEM ANOMALY DETECTION MODULE, A SYSTEM SCORE FOR THE INFORMATION SYSTEM, BASED ON A DYNAMIC WEIGHTED CALCULATION AND AN AVERAGE PERFORMANCE EVALUATION, WHEREIN THE SYSTEM SCORE FACILITATES PREDICTING AN IMPENDING ERROR BEFORE THE ERROR OCCURS ON THE INFORMATION SYSTEM

304 — DETERMINE, BY A TARGET COMPONENT ASSIGNMENT MODULE, A PLURALITY OF TARGETED COMPONENTS THAT REQUIRE LOG COLLECTION BASED ON THE SYSTEM SCORE, WHEREIN THE PLURALITY OF SYSTEM COMPONENTS COMPRISES THE PLURALITY OF TARGETED COMPONENTS, WHEREIN A LOG COLLECTION OPTIMIZATION SYSTEM COMPRISES THE SYSTEM STATUS MONITORING MODULE, THE SYSTEM ANOMALY DETECTION MODULE, AND THE TARGET COMPONENT ASSIGNMENT MODULE

306 — INVOKE, BY A LOG COLLECTION MODULE, SYSTEM LOG COLLECTION FROM THE TARGETED COMPONENTS TO INITIATE THE SYSTEM LOG COLLECTION BEFORE THE ERROR OCCURS ON THE INFORMATION SYSTEM

FIG. 2

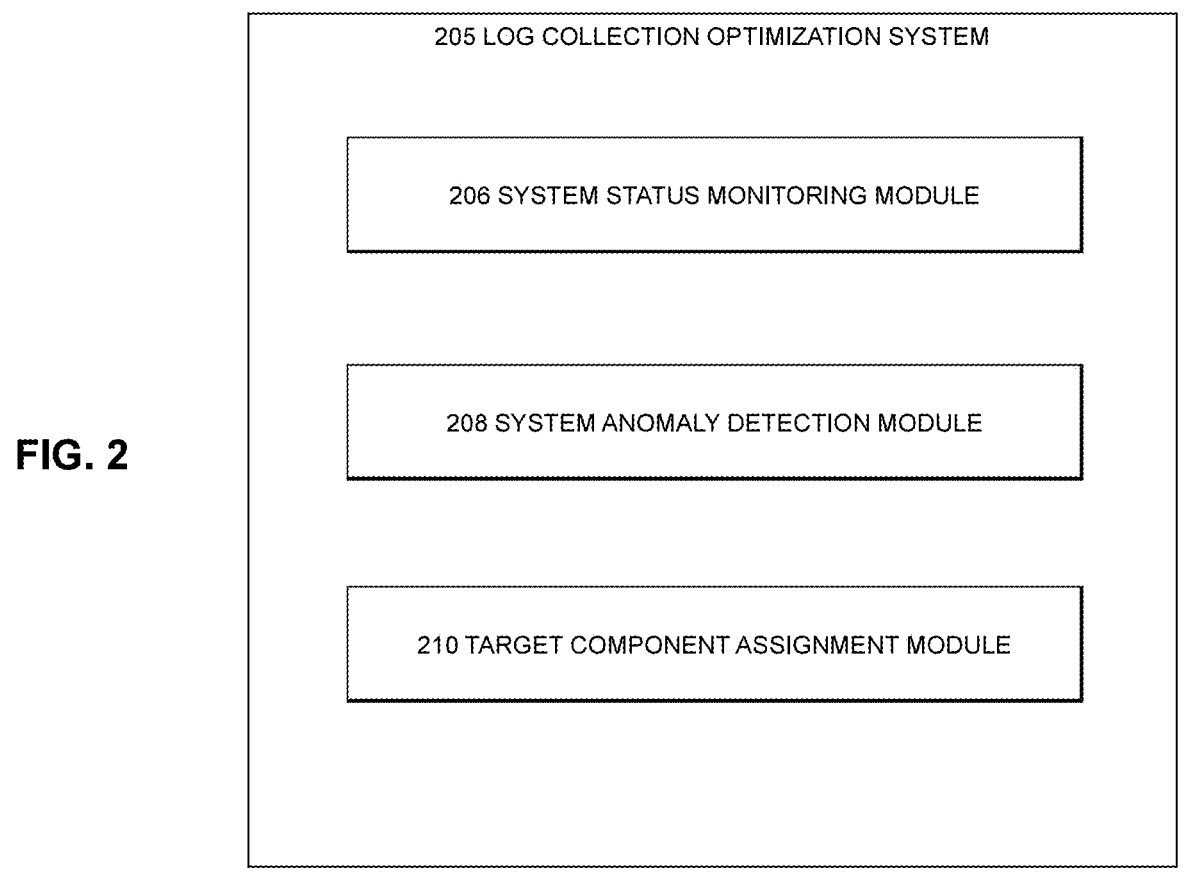

205 LOG COLLECTION OPTIMIZATION SYSTEM

206 SYSTEM STATUS MONITORING MODULE

208 SYSTEM ANOMALY DETECTION MODULE

210 TARGET COMPONENT ASSIGNMENT MODULE

INTELLIGENT SCORE-BASED LOG COLLECTION OPTIMIZING MECHANISM

FIELD

The field relates generally to optimizing error log collection, and more particularly to optimizing error log collection in information processing systems.

BACKGROUND

Error log collection, or "Log Collection" is the process of collecting log entries from different sources in an information system to analyze and leverage the data to gain valuable knowledge about the inner workings of the information system.

SUMMARY

Illustrative embodiments provide techniques for implementing a log collection optimization system in a storage system. For example, illustrative embodiments monitor, by a system status monitoring module, at least one system status associated with an information system, where the information system comprises a plurality of system components. A system anomaly detection module determines a system score for the information system, based on a dynamic weighted calculation and an average performance evaluation. The system score facilitates in predicting an impending error before the error occurs on the information system. A target component assignment module determines a plurality of targeted components that require log collection based on the system score, where the plurality of system components comprises the plurality of targeted components. A log collection optimization system comprises the system status monitoring module, the system anomaly detection module, and the target component assignment module. A log collection module invokes system log collection from the targeted components to initiate the system log collection before the error occurs on the information system. Other types of processing devices can be used in other embodiments. These and other illustrative embodiments include, without limitation, apparatus, systems, methods and processor-readable storage media.

BRIEF DESCRIPTION OF THE DRAWINGS

FIG. 2 shows a log collection optimization system in an illustrative embodiment.

DETAILED DESCRIPTION

Figure 1:
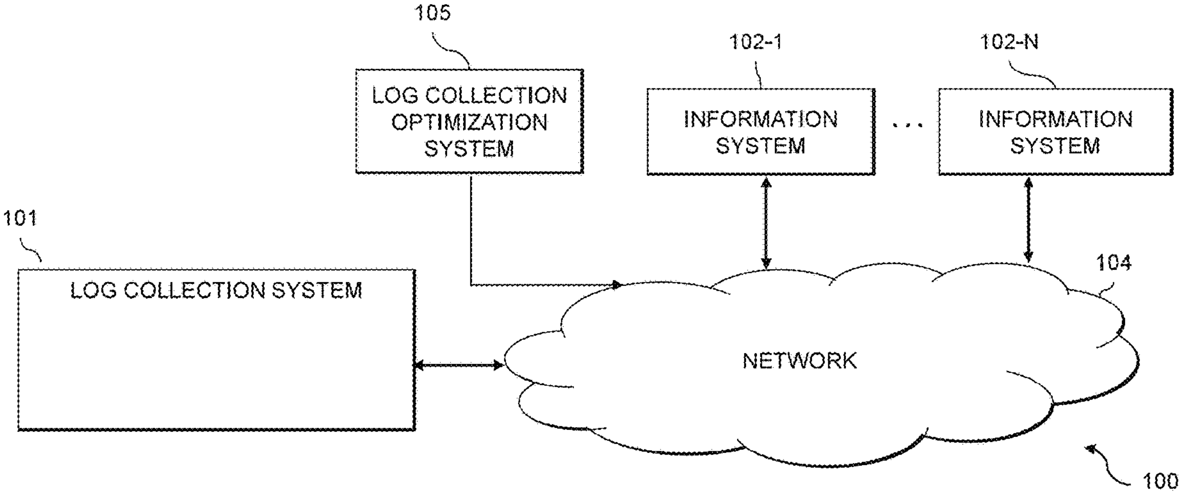
FIG. 1 shows an information processing system including a log collection optimization system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a log collection optimization system, which technique may be used to provide, among other things log collection optimization by monitoring, by a system status monitoring module, at least one system status associated with an information system, where the information system comprises a plurality of system components. A system anomaly detection module determines a system score for the information system, based on a dynamic weighted calculation and an average performance evaluation. The system score facilitates predicting an impending error before the error occurs on the information system. A target component assignment module determines a plurality of targeted components that require log collection based on the system score, where the plurality of system components comprises the plurality of targeted components. A log collection optimization system comprises the system status monitoring module, the system anomaly detection module, and the target component assignment module. A log collection module invokes system log collection from the targeted components to initiate the system log collection before the error occurs on the information system.

Typically, users archive log collection. A periodic log collection schedule is set to ensure necessary log collection for critical components of an information system are always available. Log collection may also be triggered when an error occurs on an information system.

Conventional technologies for log collection trigger when a disaster, such as DUDL (Data Unavailable/Data Lost), occurs, but fail to trigger log collection when a system anomaly could be detected before an error state occurs. Conventional technologies fail to invoke log collection before an error state. Conventional technologies fail to identify targeted components from which to collect error logs to facilitate in the debug and resolution process. Convention technologies fail to capture critical system information that may facilitate root cause analysis of the error state. Conventional technologies fail to efficiently provide effective log collection to facilitate prompt debugging and resolution to quickly recover from an information system disaster. Conventional technologies fail to provide a dynamic weighted evaluation against multiple criteria. Conventional technologies fail to provide an average criteria calculation. Conventional technologies fail to integrate both the dynamic weighted evaluation and the average criteria calculation into a comprehensive system score. Conventional technologies fail to provide a repository that maps system criteria status to targeted components to provide useful log collection data.

By contrast, in at least some implementations in accordance with the current technique as described herein, log collection is optimized by monitoring, by a system status monitoring module, at least one system status associated with an information system, where the information system comprises a plurality of system components. A system anomaly detection module determines a system score for the information system, based on a dynamic weighted calculation and an average performance evaluation. The system score facilitates predicting an impending error before the error occurs on the information system. A target component assignment module determines a plurality of targeted components that require log collection based on the system score, where the plurality of system components comprises the plurality of targeted components. A log collection optimization system comprises the system status monitoring module, the system anomaly detection module, and the target component assignment module. A log collection module invokes system log collection from the targeted components to initiate the system log collection before the error occurs on the information system.

Thus, a goal of the current technique is to provide a method and a system for a log collection optimization system that identifies a system anomaly and triggers log collection on targeted components before an error state occurs. Another goal is to provide an effective error log collection system that expedites error troubleshooting. Another goal is to provide a system that triggers log collection when a system anomaly could be detected before an error state occurs. Another goal is to capture log collection before an error state. Another goal is to identify targeted components from which to collect error logs to facilitate the debug and resolution process. Another goal is to capture and avoid loss of critical system information that may facilitate root cause analysis of the error state. Another goal is to provide effective log collection to facilitate prompt debugging and resolution to quickly recover from an information system disaster, ultimately providing a better-quality system and improving customer satisfaction. Another goal is to provide a dynamic weighted evaluation against multiple criteria. Another goal is to provide an average criteria calculation. Another goal is to integrate both the dynamic weighted evaluation and the average criteria calculation into a comprehensive system score. Yet another goal is to provide a repository that maps system criteria status to targeted components to provide useful log collection data.

In at least some implementations in accordance with the current technique described herein, the use of a log collection optimization system can provide one or more of the following advantages: providing an effective error log collection system that expedites error troubleshooting, providing a system that triggers log collection when a system anomaly could be detected before an error state occurs, invoking log collection before an error state, identifying targeted components from which to collect error logs to facilitate the debug and resolution process, capturing critical system information that may facilitate root cause analysis of the error state, providing effective log collection to facilitate prompt debugging and resolution to quickly recover from an information system disaster, providing a dynamic weighted evaluation against multiple criteria, providing an average criteria calculation, integrating both the dynamic weighted evaluation and the average criteria calculation into a comprehensive system score, and providing a repository that maps system criteria status to targeted components to provide useful log collection data.

In contrast to conventional technologies, in at least some implementations in accordance with the current technique as described herein, log collection is optimized by monitoring, by a system status monitoring module, at least one system status associated with an information system, where the information system comprises a plurality of system components. A system anomaly detection module determines a system score for the information system, based on a dynamic weighted calculation and an average performance evaluation. The system score facilitates predicting an impending error before the error occurs on the information system. A target component assignment module determines a plurality of targeted components that require log collection based on the system score, where the plurality of system components comprises the plurality of targeted components. A log collection optimization system comprises the system status monitoring module, the system anomaly detection module, and the target component assignment module. A log collection module invokes system log collection from the targeted components to initiate the system log collection before the error occurs on the information system.

In an example embodiment of the current technique, the system status comprises at least one of Central Processing Unit (CPU) usage status, memory usage status, Input/Output (IO) load status, and capacity usage status.

In an example embodiment of the current technique, the system anomaly detection module system determines that the dynamic weighted calculation comprises weighting at least one system status.

In an example embodiment of the current technique, the log collection optimization system defines a risk level for at least one system status, and determines a percentage range for at least one system status. The log collection optimization system utilizes the risk level and the percentage range to determine the weight of at least one system status.

In an example embodiment of the current technique, the log collection optimization system tunes the weight of at least one system status to balance usage of the information system represented by at least one system status.

In an example embodiment of the current technique, the log collection optimization system determines the average performance evaluation for at least one system status.

In an example embodiment of the current technique, the log collection optimization system determines a usage weight for at least one system status.

In an example embodiment of the current technique, the log collection optimization system determines at least one periodic weight for at least one system status, where the periodic weight represents at least one system status usage percentage at a period in time.

In an example embodiment of the current technique, the log collection optimization system tunes at least one periodic weight to optimize the average performance evaluation.

In an example embodiment of the current technique, the log collection optimization system sets a default weight for at least one periodic weight.

In an example embodiment of the current technique, the log collection optimization system determines that the system score exceeds a threshold, indicating the impending error on the information system.

In an example embodiment of the current technique, the log collection optimization system maintains a historical repository that associates historical errors with corresponding helpful error logs.

In an example embodiment of the current technique, the log collection optimization system maintains a historical repository that associates historical errors with corresponding historical system status.

In an example embodiment of the current technique, the log collection optimization system maps the risk level for at least one system status to the respective target components.

In an example embodiment of the current technique, the log collection optimization system matches the risk level for at least one system status to the respective target components to identify the plurality of targeted components.

In an example embodiment of the current technique, the log collection optimization system detects that the system score exceeds a threshold, and triggers the log collection module automatically to collect logs from the targeted components.

In an example embodiment of the current technique, the log collection optimization system continues to monitor at least one system status until the system score exceeds a threshold.

FIG. 1 shows a computer network (also referred to herein as an information processing system) 100 configured in accordance with an illustrative embodiment. The computer network 100 comprises a log collection system 101, log collection optimization system 105, and information systems 102-N. The log collection system 101, log collection optimization system 105, and information systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a log collection optimization system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the information systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The information systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the log collection optimization system 105 are one or more input-output devices, which illustratively comprise keyboards, displays or other types of input-output devices in any combination. Such input-output devices can be used, for example, to support one or more user interfaces to the log collection optimization system 105, as well as to support communication between the log collection optimization system 105 and other related systems and devices not explicitly shown. For example, a dashboard may be provided for a user to view a progression of the execution of the log collection optimization system 105. One or more input-output devices may also be associated with any of the information systems 102-N.

Additionally, the log collection optimization system 105 in the FIG. 1 embodiment is assumed to be implemented using at least one processing device. Each such processing device generally comprises at least one processor and an associated memory, and implements one or more functional modules for controlling certain features of the log collection optimization system 105.

More particularly, the log collection optimization system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the log collection optimization system 105 to communicate over the network 104 with the log collection system 101, and information systems 102-N and illustratively comprises one or more conventional transceivers.

A log collection optimization system 105 may be implemented at least in part in the form of software that is stored in memory and executed by a processor, and may reside in any processing device. The log collection optimization system 105 may be a standalone plugin that may be included within a processing device.

It is to be understood that the particular set of elements shown in FIG. 1 for log collection optimization system 105 involving the log collection system 101, and information systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the log collection optimization system 105 can be on and/or part of the same processing platform.

FIG. 2 shows a log collection optimization system 205. The log collection optimization system 205 comprises the system status monitoring module 206, the system anomaly detection module 208, and the target component assignment module 210.

An exemplary process of log collection optimization system 105 in computer network 100 will be described in more detail with reference to, for example, the flow diagram of FIG. 3.

Figure 3:
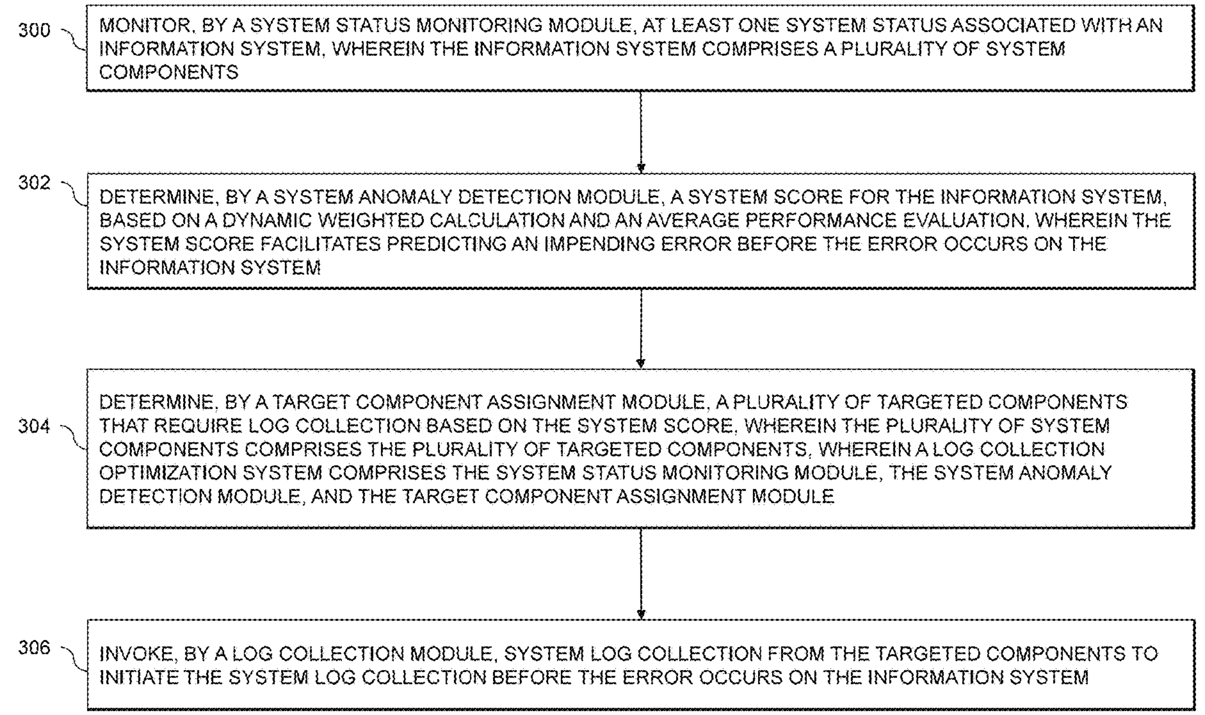
FIG. 3 shows a flow diagram of a process for a log collection optimization system in an illustrative embodiment.

FIG. 3 is a flow diagram of a process for execution of the log collection optimization system 105 in an illustrative embodiment. It is to be understood that this particular process is only an example, and additional or alternative processes can be carried out in other embodiments.

At 300, the system status monitoring module 206 monitors at least one system status associated with an information system 102-N. In an example embodiment, the system status monitoring module 206 monitors at least one of Central Processing Unit (CPU) usage status, memory usage status, Input/Output (IO) load status, and capacity usage status. In an example embodiment, the system status monitoring module 206 may also monitor other criteria associated with the information system 102-N, for example, criteria associated with system components of the information system 102-N that are most relevant to customers' situation and/or use of the information system 102-N.

At 302, the system anomaly detection module 208 determines a system score for the information system 102-N, based on a dynamic weighted calculation and an average performance evaluation. The system score facilitates predicting an impending error before the error occurs on the information system 102-N. If an individual score for any of the system components is too high, that system component may cause the information system 102-N to experience poor performance, and an error may occur in the future. In another example scenario, while each individual score may be within an acceptable threshold, the total score of the information system 102-N (i.e., the system score) may be higher than a pre-defined threshold. In this example scenario, the log collection optimization system 105 determines an anomaly has occurred in the information system 102-N and triggers log collection of targeted components. In an example embodiment, the log collection optimization system 105 continues to monitor at least one system status until the system score exceeds a threshold.

In an example embodiment, the system score, S, is represented as:

$$S = \omega_{CPU} \cdot C_{CPU} + \omega_{Mem} \cdot C_{Mem} + \omega_{IO} \cdot C_{IO} + \omega_{cap} \cdot C_{cap}$$

The CPU usage percentage is represented by $C_{CPU}$, the memory usage percentage is represented by $C_{Mem}$, the IO (Input/Output) load percentage is represented by $C_{IO}$, and the capacity percentage usage percentage is represented by $C_{cap}$. These values may be obtained by system API (Application Program Interface). Additional system component usage percentages may be defined as $C_{other}$ based on customer requirements.

In an example embodiment, the system anomaly detection module 208 determines the dynamic weighted calculation. The dynamic weighted calculation comprises weighting at least one system status. In another example embodiment, the dynamic weighted calculation comprises weighting each of the system statuses. The weight of CPU usage is represented by $\omega_{CPU}$, the weight of memory usage is represented by $\omega_{Mem}$, the weight of IO load percentage is represented by $\omega_{IO}$, and the weight of capacity usage is represented by $\omega_{cap}$. Additionally, $\omega_{CPU}+\omega_{Mem}+\omega_{IO}+\omega_{cap}=1$. In an example embodiment, the weights of the one or more system statuses are tuned to balance usage of the information system represented by the one or more system statuses.

In an example embodiment, the weights of the one or more system statuses are distributed evenly. In another example embodiment, each of the one or more system statuses has a different risk level, where the risk level or degree increases as the usage of the system component increases (represented by the system status). For example, there may be little or no concern when CPU usage is below 60% or less, but there may be some concern when CPU usage is between 60% and 85%. When the CPU usage is above 85%, each 1% increase also increases the risk level, and therefore, in this example scenario, the weight of the CPU usage will also increase. Similarly, each of the other system statuses also have different risk levels, and the weights assigned to each system status change as the risk levels increase or decrease.

In an example embodiment, the system anomaly detection module 208 defines a risk level for at least one system status. In an example embodiment, the system anomaly detection module 208 determines a percentage range for at least one system status. For example, the risk level and the percentage range may be defined as:

| Risk Level | System Status Percentage Range |
|---|---|
| 1 | [0%, 60%] |
| 2 | [61%, 85%] |
| 3 | [86%, 100%] |

In an example embodiment, the system anomaly detection module 208 utilizes the risk level and the percentage range to determine the weight of at least one system status. In an example embodiment, the system anomaly detection module 208 determines a usage weight for at least one system status.

For example, $D_{criterion\ i}$ represents the risk level for each system status i. The weight value $\omega_{criterion\ i}$ of each system status i (where system status is represented by "criterion" in the equation) is calculated as follows:

$$\omega_{criterion\,i} = \frac{D_{criterion\,i}}{\sum_{all\,criteria} D_{criterion\,i}}$$

For example, if $C_{CPU}$=50%, $C_{Mem}$=80%, $C_{IO}$=90% and $C_{cap}$=70%, and $D_{CPU}$=1, $D_{Mem}$=2, $D_{IO}$=3 and $D_{cap}$=2, then $\omega_{CPU}$=12.5%, $\omega_{Mem}$=25%, $\omega_{IO}$=37.5% and $\omega_{cap}$=25%. Thus, the system statuses are defined by more detailed risk degree distributions, and a more accurate weight can be determined as changes occur in the information system 102-N.

In an example embodiment, the system anomaly detection module 208 determines the average performance evaluation for at least one system status. A given system component has different statuses and trends at different points in time. For example, the current state of the CPU status may be represented as $C_{CPU,\ now}$, a recent state of the CPU may be represented as $C_{CPU,\ 5\ min}$ (i.e., 5 minutes ago), and a persistent state of the CPU may be represented as $C_{CPU,\ 15\ min}$ (i.e., 15 minutes ago). In an example embodiment, if $C_{CPU,\ now}$, $C_{CPU,\ 5\ min}$, and $C_{CPU,\ 5\ min}$ reveal an increasing or decreasing trend, then that indicates that the CPU performance is (respectively) getting worse or better with time. If $C_{CPU,\ now}$, $C_{CPU,\ 5\ min}$, and $C_{CPU,\ 15\ min}$ are roughly equal, this indicates the CPU performance is steady (whether the CPU is busy or free). If, instead of tracking the CPU usage at, for example, 1 minute, 5 minute, or 15 minute intervals, the CPU usage is tracked at different time series, for example, randomly, periodically, etc., the intervals at which the CPU usage is tracked will provide a different meaning to the whole overall performance of the CPU.

In an example embodiment, the system anomaly detection module 208 determines at least one periodic weight for at least one system status, where the periodic weight represents at least one system status usage percentage at a period in time. To achieve a more accurate system anomaly status detection for each system status' average performance evaluation, the system anomaly detection module 208 determines the average performance over a period of time. In an example embodiment, the system anomaly detection module 208 determines the average performance at a current time, at a time 5 minutes before the current, and at a time 15 minutes before the current time. The average performance may be determined by:

$$C_{criterion\ i} = C_{criterion\ i,avg(now,5\ mins,15\ mins)} = \lambda_{criterion\ i,1} \cdot C_{criterion\ i,now} + \lambda_{criterion\ i,2} \cdot C_{criterion\ i,5\ min} + \lambda_{criterion\ i,3} \cdot C_{criterion\ i,15\ min}$$

In the above equation, the system status is represented by criterion i, and the above equation would be determined for one or more of the system statuses. In the above equation, $\lambda_1$ $\lambda_2$ and $\lambda_3$ represent periodic weights of criterion i's (i.e., a system status) usage percentage at time equals now, time equals 5 minutes ago, and time equals 15 minutes ago, and $\lambda_1+\lambda_2+\lambda_3=1$. In an example embodiment, the system anomaly detection module 208 tunes at least one periodic weight to optimize the average performance evaluation. In an example embodiment, the weights are tuned to obtain a better overall average system status (i.e., criterion) usage performance. In an example embodiment, the system anomaly detection module 208 sets a default weight for at least one periodic weight, for example, $\lambda_1$ $\lambda_2$ and $\lambda_3$ are assigned with value 0.44, 0.33, and 0.23 respectively.

In an example embodiment, the system anomaly detection module 208 determines that the system score exceeds a threshold, which indicates the impending error on the information system. In an example embodiment, the log collection optimization system 105 monitors the system statuses of the information system 102-N real-time and calculates the performance score of the information system 102-N. When the system score, S, exceeds an acceptable threshold value, θ, the system anomaly detection module 208 determines there is a system anomaly, and an error/failure is predicted. In an example embodiment, the log collection optimization system 105 continues to monitor at least one system status until the system score exceeds a threshold.

In an example embodiment, the system anomaly detection module 208 detects that the system score, S, exceeds a threshold, and triggers the log collection module to collect logs from the targeted components. In an example embodiment, S may be represented as:

$$S = \sum_{all\ criteria} \omega_{criterion\ i} \cdot C_{criterion\ i} = \sum_{all\ criteria} \frac{D_{criterion\ i}}{\sum_{all\ criteria} D_{criterion\ i}} \cdot C_{criterion\ i,avg(now,5\ mins,15\ mins)}$$

At 304, the target component assignment module 210 determines a plurality of targeted components that require log collection based on the system score, where the plurality of system components comprises the plurality of targeted components.

At 306, the log collection module 101 invokes system log collection from the targeted components to initiate the system log collection before the error occurs on the information system 102-N. When a possible system anomaly is detected, the simplest solution is to collect the system logs from all of the components in the information system 102-N. This is time consuming, increases system load, and may also impact the performance of the information system 102-N. Ideally, collecting system logs from targeted components reduces the time, system load and performance impact, but if an impending error has yet to occur, the challenge becomes selecting the targeted components of which to collect error logs such that those error logs are most helpful in debugging the errors that eventually occur (as a result of the impending error) on the information system 102-N.

In an example embodiment, the target component assignment module 210 maintains a historical repository that associates historical errors with corresponding helpful error logs. In an example embodiment, the historical repository may comprise system criteria status (such as CPU status, memory status, IO load status, capacity status, and other statuses), along with components associated with the information system 102-N from which error logs can be collected.

In an example embodiment, the target component assignment module 210 maintains a historical repository that associates historical errors with corresponding historical system status. In an example embodiment, the target component assignment module 210 maps the risk level for at least one system status to the respective target components. In other words, the target component assignment module 210 maintains a repository that records the relationships between the system criteria status, and the components associated with the information system 102-N from which error logs can be collected. Listed below is an example embodiment of the repository.

| Risk Degree of CPU | Risk Degree of Memory | Risk Degree of IO Load | Risk Degree of Capacity | Target Components |
|---|---|---|---|---|
| 3 | 1 | 1 | 2 | A, B, E |
| 2 | 2 | 2 | 3 | B, C, D |
| 1 | 3 | 2 | 2 | B, E |
| 2 | 2 | 2 | 3 | A, D |

In an example embodiment, the repository data becomes richer and more comprehensive as errors are detected. In an example embodiment, when a risk level is detected that is at a concerning level for a system status, the target component assignment module 210 searches the repository to identify the risk level for the system status. In an example embodiment, the target component assignment module 210 matches the risk level for at least one system status to the respective target components to identify the plurality of targeted components. In other words, once the risk level/degree is identified, the target component assignment module 210 identifies the target components that are mapped to the risk level/degree associated with the system status. The system anomaly detection module 208 then triggers a log collection against the critical components (i.e., the target components) that are most likely to be helpful and critical to resolving the impending error.

For example, using the above table, for a system status of {2, 2, 2, 3}, there are two rows in the table that match. The current target components are {B, C, D} U {A, D}={A, B, C, D}.

In an example embodiment, if the target component assignment module 210 does not find a match in the repository, the system anomaly detection module 208 triggers a full log collection of the system components of the information system 102-N. For example, a system status of {3, 3, 3, 1} does not match to any rows in the table, so all the defined components' system logs are collected to ensure that no critical logs are missed.

When an error occurs in an information system 102-N, and the root cause is identified, the system criteria status and corresponding components that provided useful log collection data are added to the repository. As the repository is added to over time, the data becomes richer and there is less of a chance of having a system status that cannot be matched in the repository. Thus, when a new system anomaly is detected, the log collection optimization system 105 quickly identifies a list of target components that will produce effective error logs to identify the root cause of the system anomaly.

In an example embodiment, the system performance status is as follows:

| Criteria/Time | Now | 5 Minutes Ago | 15 Minutes Ago |
|---|---|---|---|
| CPU Percentage | 52% | 44% | 25% |
| Memory Usage Percentage | 77% | 56% | 81% |
| IO Load Percentage | 88% | 90% | 95% |
| Capacity Usage Percentage | 82% | 68% | 30% |

The system score, S, is calculated as follows:

$$S = \sum_{all\ criteria} \omega_{criterion\ i} \cdot C_{criterion\ i} = \sum_{all\ criteria} \frac{D_{criterion\ i}}{\sum_{all\ criteria} D_{criterion\ i}} \cdot C_{criterion\ i,avg\{now,5\ mins,15\ mins\}}$$

The average performance evaluation is calculated:

$$C_{criterion\ i,avg\{now,5\ mins,15\ mins\}} = \lambda_{criterion\ i,1} \cdot C_{criterion\ i,now} + \lambda_{criterion\ i,2} \cdot C_{criterion\ i,5\ min} + \lambda_{criterion\ i,3} \cdot C_{criterion\ i,15\ min}$$

where, $\lambda_1$=0.44, $\lambda_2$=0.33 and $\lambda_3$=0.23.

| Criteria/Time | Now | 5 mins ago | 15 mins ago | $C_{criterion\ i,\ avg\{now,\ 5\ mins,\ 15\ mins\}}$ |
|---|---|---|---|---|
| CPU | 52% | 44% | 25% | 0.44*52% + 0.33*44% + 0.23*25% = 43.15% |
| Memory usage percentage | 77% | 56% | 81% | 70.99% |
| IO load percentage | 88% | 90% | 95% | 90.27% |
| Capacity usage percentage | 82% | 68% | 30% | 65.42% |

Next, the weight of the system status. $\omega_{criterion\ i}$, is calculated as:

$$\omega_{criterion\ i} = \frac{D_{criterion\ i}}{\Sigma_{all\ criteria} D_{criterion\ i}}$$

Using the risk level and the percentage range for each system status:

| Risk Level | System Status Percentage Range |
|---|---|
| 1 | [0%, 60%] |
| 2 | [61%, 85%] |
| 3 | [86%, 100%] |

| Criteria/Time | Now | 5 mins ago | 15 mins ago | $C_{criterion\ i,\ avg\{now,\ 5\ mins,\ 15\ mins\}}$ | Risk Level $D_{criterion\ i}$ | weight value $\omega_{criterion\ i}$ |
|---|---|---|---|---|---|---|
| CPU | 52% | 44% | 25% | 43.15% | 1 | 12.5% |
| Memory usage % | 77% | 56% | 81% | 70.99% | 2 | 25% |
| IO load % | 88% | 90% | 95% | 90.27% | 3 | 37.5% |
| Capacity usage % | 82% | 68% | 30% | 65.42% | 2 | 25% |

Next, the system score, S, is calculated:

$$S=\sum_{all\ criteria}\omega_{criterion\ i}\cdot C_{criterion\ i}=$$
$$\omega_{CPU}\cdot C_{CPU}+\omega_{Mem}\cdot C_{Mem}+\omega_{IO}\cdot C_{IO}+\omega_{cap}\cdot C_{cap}=12.5\%*43.15\%+25\%*70.99\%+37.5\%*90.27\%+25\%*65.42\%=73.35\%$$

In an example embodiment, the threshold value θ=70%. The system score, S=73.35% exceeds the threshold value, and the log collection optimization system 105 will automatically trigger the log collection system 101.

The target component assignment module 210 matches the system status with the repository. In an example embodiment, the repository may be known as the log collection target components assignment table.

| Risk Degree of CPU | Risk Degree of Memory | Risky Degree of IO Load | Risky Degree of Capacity | Target Components |
|---|---|---|---|---|
| 3 | 1 | 1 | 2 | A, B, E |
| 2 | 2 | 2 | 3 | B, C, D |
| 1 | 2 | 3 | 2 | A, E |
| 1 | 3 | 2 | 2 | B, E |
| 1 | 2 | 3 | 2 | A, B |
| 2 | 2 | 2 | 3 | A, D |

If the system status is {1, 2, 3, 2}, there are two rows in the table with matching items. The current target components are therefore, {A, E} U {A, B}={A, B, E}. Thus, the system anomaly detection module 208 triggers the log collection system 101 to collect system logs from the targeted components represented by {A, B, E}.

Accordingly, the particular processing operations and other functionality described in conjunction with the flow diagram of FIG. 3 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to identify an anomaly in a system and trigger log collection of targeted components providing useful information for debugging and resolution. These and other embodiments can effectively improve log collection on information systems relative to conventional approaches. For example, embodiments disclosed herein provide an effective error log collection system that expedites error troubleshooting. Embodiments disclosed herein provide a system that triggers log collection when a system anomaly could be detected before an error state occurs. Embodiments disclosed herein invoke log collection before an error state. Embodiments disclosed herein identify targeted components from which to collect error logs to facilitate in the debug and resolution process. Embodiments disclosed herein capture and avoid loss of critical system information that may facilitate root cause analysis of the error state. Embodiments disclosed herein provide effective log collection to facilitate prompt debugging and resolution to quickly recover from an information system disaster, ultimately providing a better-quality system and improving customer satisfaction. Embodiments disclosed herein provide a dynamic weighted evaluation against multiple criteria. Embodiments disclosed herein provide an average criteria calculation. Embodiments disclosed herein integrate both the dynamic weighted evaluation and the average criteria calculation into a comprehensive system score. Embodiments disclosed herein provide a repository that maps system criteria status to targeted components that provide useful log collection data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of the information processing system 100, these platforms may also be used to implement at least portions of other information processing systems in other embodiments.

Figure 4:
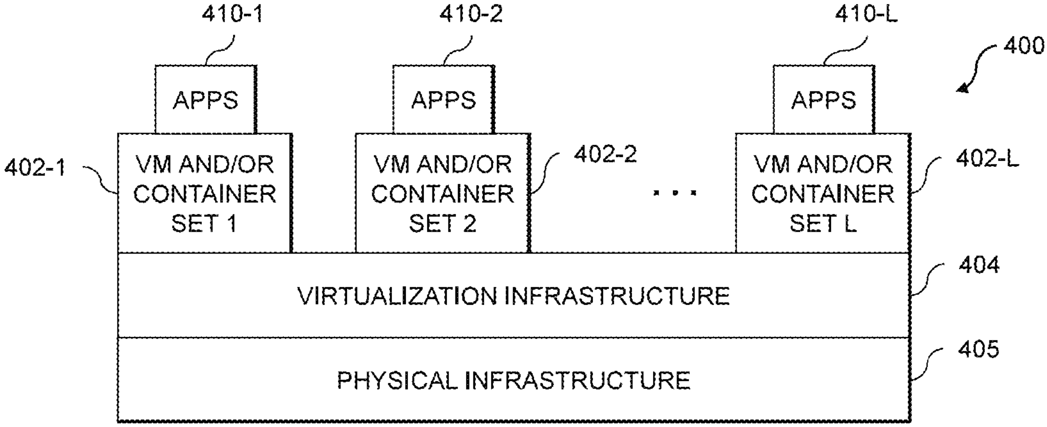
FIGS. 4 and 5 show examples of processing platforms that may be utilized to implement at least a portion of a log collection optimization system embodiments.
Figure 5:
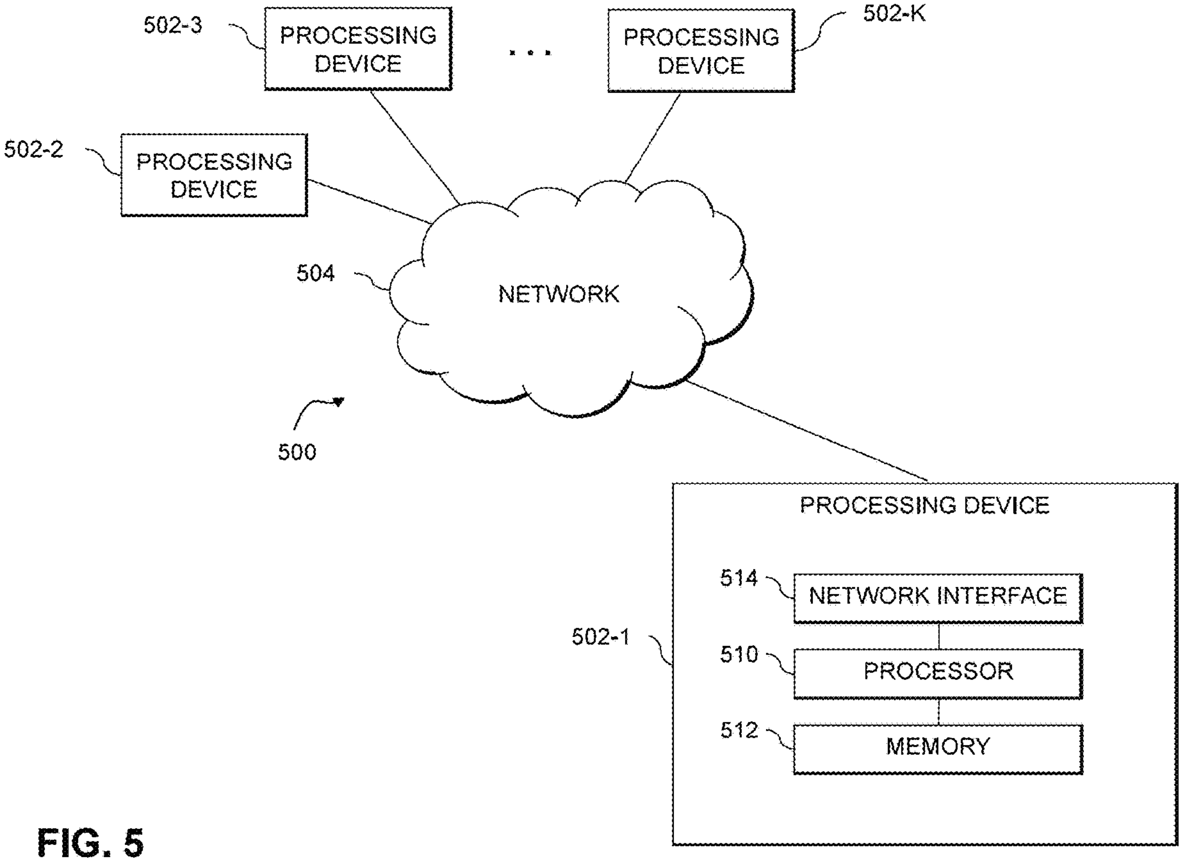

FIG. 4 shows an example processing platform comprising cloud infrastructure 400. The cloud infrastructure 400 comprises a combination of physical and virtual processing resources that are utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that comprises at least one hypervisor.

A hypervisor platform may be used to implement a hypervisor within the virtualization infrastructure 404, where the hypervisor platform has an associated virtual infrastructure management system. The underlying physical machines comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of the information processing system 100 and includes a plurality of processing devices, denoted 502-1, 502-2, 502-3, . . . 502-K, which communicate with one another over a network 504.

The network 504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 comprises a microprocessor, a microcontroller, an application-specific integrated circuit (ASIC), a field-programmable gate array (FPGA) or other type of processing circuitry, as well as portions or combinations of such circuitry elements.

The memory 512 comprises random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 604 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

monitoring, in real-time, by a system status monitoring module executing on at least one processing device obtaining system status values via system Application Programming Interfaces (APIs), at least one system status associated with an information system, wherein the information system comprises a plurality of system components including at least Central Processing Unit (CPU), memory, Input/Output (I/O), and capacity components;

determining, by a system anomaly detection module executing on the at least one processing device, a system score for the information system, based on a dynamic weighted calculation and an average performance evaluation across multiple time periods, wherein the system score facilitates predicting an impending error before the error occurs on the information system, wherein the dynamic weighted calculation comprises weighting the at least one system status by defining a risk level for the at least one system status using a risk level table mapping percentage ranges to risk levels, determining a percentage range for the at least one system status, and utilizing the risk level and the percentage range to determine a weight of the at least one system status, wherein the average performance evaluation comprises determining at least one periodic weight for the at least one system status, wherein the at least one periodic weight represents the at least one system status usage percentage at a current time, a first prior time period, and a second prior time period, wherein the average performance evaluation analyzes whether system performance is increasing, decreasing, or steady, wherein determining the system score improves computer system reliability by enabling proactive error prevention that reduces system downtime and data loss;

determining, by a target component assignment module executing on the at least one processing device, a plurality of targeted components that require log collection based on the system score using a historical repository that maps risk levels of system statuses to specific system components by matching the risk level for the at least one system status to respective target components in the historical repository to identify the plurality of targeted components, wherein the plurality of system components comprises the plurality of targeted components, wherein the targeted component selection optimizes system performance by reducing computational load and conserving memory resources through selective log collection from only the targeted components, wherein a log collection optimization system comprises the system status monitoring module, the system anomaly detection module, and the target component assignment module; and in response to the system anomaly detection module determining that the system score exceeds a threshold, triggering by the log collection optimization system a log collection module executing on the at least one processing device, to collect system log collection from only the targeted components executing on the information system before the error occurs on the information system, wherein the proactive targeted log collection prevents loss of critical diagnostic data that facilitates system recovery and root cause analysis, wherein the method is performed by at least one processing device comprising a processor coupled to a memory.

2. The method of claim 1 wherein the at least one system status comprises at least one of Central Processing Unit (CPU) usage status, memory usage status, Input/Output (IO) load status, and capacity usage status.

3. The method of claim 1 wherein determining, by the system anomaly detection module, the system score for the information system comprises:

determining the dynamic weighted calculation comprises weighting the at least one system status.

4. The method of claim 3 wherein determining the dynamic weighted calculation comprises:

defining a risk level for the at least one system status;

determining a percentage range for the at least one system status; and utilizing the risk level and the percentage range to determine the weight of the at least one system status.

5. The method of claim 4 further comprising:

tuning the weight of the at least one system status to balance usage of the information system represented by the at least one system status.

6. The method of claim 1 wherein determining, by the system anomaly detection module, the system score for the information system comprises:

determining the average performance evaluation for the at least one system status.

7. The method of claim 6 wherein determining the average performance evaluation for the at least one system status comprises:

determining a usage weight for the at least one system status.

8. The method of claim 7 further comprising:

determining at least one periodic weight for the at least one system status, wherein the at least one periodic weight represents the at least one system status usage percentage at a period in time.

9. The method of claim 8 further comprising:

tuning the at least one periodic weight to optimize the average performance evaluation, wherein tuning the at least one periodic weight comprises adjusting the at least one periodic weight to obtain improved average system status usage performance for a particular system monitoring context.

10. The method of claim 9 further comprising:

setting a default weight for the at least one periodic weight.

11. The method of claim 1 wherein determining, by the system anomaly detection module, the system score for the information system comprises:

automatically determining, by the system anomaly detection module, that the system score exceeds a threshold, indicating the impending error on the information system.

12. The method of claim 1 wherein determining, by the target component assignment module, the plurality of targeted components that require log collection based on the system score comprises:

maintaining a historical repository that associates historical errors with corresponding helpful error logs.

13. The method of claim 1 wherein determining, by the target component assignment module, the plurality of targeted components that require log collection based on the system score comprises:

maintaining a historical repository that associates historical errors with corresponding historical system status.

14. The method of claim 1 wherein determining, by the target component assignment module, the plurality of targeted components that require log collection based on the system score comprises:

mapping the risk level for the at least one system status to the respective target components.

15. The method of claim 1 wherein determining, by the target component assignment module, the plurality of targeted components that require log collection based on the system score comprises:

matching the risk level for the at least one system status to the respective target components to identify the plurality of targeted components.

16. The method of claim 1 wherein invoking, by the log collection module, system log collection from the targeted components comprises:

automatically detecting, by the system anomaly detection module, that the system score exceeds a threshold; and automatically triggering, by the system anomaly detection module, the log collection module to collect logs from the targeted components.

17. The method of claim 1 further comprising:

continuing to monitor the at least one system status until the system score exceeds a threshold.

18. A system comprising:

at least one processing device comprising a processor coupled to a memory;

the at least one processing device being configured:

to monitor, in real-time, by a system status monitoring module executing on at least one processing device obtaining system status values via system Application Programming Interfaces (APIs), at least one system status associated with an information system, wherein the information system comprises a plurality of system components including at least Central Processing Unit (CPU), memory, Input/Output (I/O), and capacity components;

to determine, by a system anomaly detection module executing on the at least one processing device, a system score for the information system, based on a dynamic weighted calculation and an average performance evaluation across multiple time periods, wherein the system score facilitates predicting an impending error before the error occurs on the information system, wherein the dynamic weighted calculation comprises weighting the at least one system status by defining a risk level for the at least one system status using a risk level table mapping percentage ranges to risk levels, determining a percentage range for the at least one system status, and utilizing the risk level and the percentage range to determine a weight of the at least one system status, wherein the average performance evaluation comprises determining at least one periodic weight for the at least one system status, wherein the at least one periodic weight represents the at least one system status usage percentage at a current time, a first prior time period, and a second prior time period, wherein the average performance evaluation analyzes whether system performance is increasing, decreasing, or steady, wherein determining the system score improves computer system reliability by enabling proactive error prevention that reduces system downtime and data loss;

to determine, by a target component assignment module executing on the at least one processing device, a plurality of targeted components that require log collection based on the system score using a historical repository that maps risk levels of system statuses to specific system components by matching the risk level for the at least one system status to respective target components in the historical repository to identify the plurality of targeted components, wherein the plurality of system components comprises the plurality of targeted components, wherein the targeted component selection optimizes system performance by reducing computational load and conserving memory resources through selective log collection from only the targeted components, wherein a log collection optimization system comprises the system status monitoring module, the system anomaly detection module, and the target component assignment module; and in response to the system anomaly detection module determining that the system score exceeds a threshold, to trigger by the log collection optimization system a log collection module executing on the at least one processing device, to collect system log collection from only the targeted components executing on the information system before the error occurs on the information system, wherein the proactive targeted log collection prevents loss of critical diagnostic data that facilitates system recovery and root cause analysis.

19. The system of claim 18 further configured to:

continue to monitor the at least one system status until the system score exceeds a threshold.

20. A computer program product comprising a non-transitory processor-readable storage medium having stored therein program code of one or more software programs, wherein the program code when executed by at least one processing device causes said at least one processing device:

to monitor, in real-time, by a system status monitoring module executing on at least one processing device obtaining system status values via system Application Programming Interfaces (APIs), at least one system status associated with an information system, wherein the information system comprises a plurality of system components including at least Central Processing Unit (CPU), memory, Input/Output (I/O), and capacity components;

to determine, by a system anomaly detection module executing on the at least one processing device, a system score for the information system, based on a dynamic weighted calculation and an average performance evaluation across multiple time periods, wherein the system score facilitates predicting an impending error before the error occurs on the information system, wherein the dynamic weighted calculation comprises weighting the at least one system status by defining a risk level for the at least one system status using a risk level table mapping percentage ranges to risk levels, determining a percentage range for the at least one system status, and utilizing the risk level and the percentage range to determine a weight of the at least one system status, wherein the average performance evaluation comprises determining at least one periodic weight for the at least one system status, wherein the at least one periodic weigm represents the at least one system status usage percentage at a current time, a first prior time period, and a second prior time period, wherein the average performance evaluation analyzes whether system performance is increasing, decreasing. or steady. wherein determining the system score improves computer system reliability by enabling proactive error prevention that reduces system downtime and data loss;

to determine, by a target component assignment module executing on the at least one processing device, a plurality of targeted components that require log collection based on the system score using a historical repository that maps risk levels of system statuses to specific system components by matching the risk level for the at least one system status to respective target components in the historical repository to identify the plurality of targeted components, wherein the plurality of system components comprises the plurality of targeted components, wherein the targeted component selection optimizes system performance by reducing computational load and conserving memory resources through selective log collection from only the targeted components, wherein a log collection optimization system comprises the system status monitoring module, the system anomaly detection module, and the target component assignment module; and in response to the system anomaly detection module determining that the system score exceeds a threshold, to trigger by the log collection optimization system a log collection module executing on the at least one processing device, to collect system log collection from only the targeted components executing on the information system before the error occurs on the information system, wherein the proactive targeted log collection prevents loss of critical diagnostic data that facilitates system recovery and root cause analysis.

* * * * *